(12) United States Patent
Estrella et al.

(10) Patent No.: US 7,585,115 B2
(45) Date of Patent: Sep. 8, 2009

(54) BEZEL FOR FIBER OPTIC COMPONENTS

(75) Inventors: Jeffrey Estrella, Tewksbury, MA (US); George Ashouri, Wheaton, IL (US)

(73) Assignee: Tellabs Operations, Inc., Naperville, IL (US)

( * ) Notice: Subject to any disclaimer, the term of this patent is extended or adjusted under 35 U.S.C. 154(b) by 0 days.

(21) Appl. No.: 11/747,986

(22) Filed: May 14, 2007

(65) Prior Publication Data
US 2008/0187269 A1    Aug. 7, 2008

Related U.S. Application Data

(63) Continuation of application No. 11/584,661, filed on Oct. 23, 2006, now Pat. No. 7,237,964, which is a continuation of application No. 11/378,348, filed on Mar. 20, 2006, now Pat. No. 7,153,032, which is a continuation of application No. 10/775,682, filed on Feb. 10, 2004, now Pat. No. 7,036,994, which is a continuation of application No. 09/628,348, filed on Jul. 28, 2000, now Pat. No. 6,695,485.

(51) Int. Cl.
G02B 6/36 (2006.01)
(52) U.S. Cl. .......................................... 385/53; 385/77
(58) Field of Classification Search ................... 385/53, 385/54, 55, 60, 77; 439/553, 557
See application file for complete search history.

(56) References Cited

U.S. PATENT DOCUMENTS

| | | | |
|---|---|---|---|
| 3,781,537 A | 12/1973 | Ramsey | 240/8.16 |
| 4,261,640 A | 4/1981 | Stankos et al. | 350/96.15 |
| 4,611,887 A | 9/1986 | Glover et al. | 385/71 |
| 4,753,511 A | 6/1988 | Bowers et al. | 350/96.21 |
| 4,900,124 A | 2/1990 | Lampert et al. | 350/96.21 |
| 4,960,317 A | 10/1990 | Briggs et al. | 385/56 |
| 5,046,956 A | 9/1991 | Takano | 439/78 |
| 5,073,046 A | 12/1991 | Edwards et al. | 385/90 |
| 5,082,345 A | 1/1992 | Cammons et al. | 385/60 |
| 5,124,506 A | 6/1992 | Briggs et al. | 174/67 |
| 5,142,597 A | 8/1992 | Mulholland et al. | 385/56 |
| 5,222,908 A | 6/1993 | Baker, III et al. | 439/557 |
| 5,274,729 A | 12/1993 | King et al. | 385/134 |
| 5,542,015 A | 7/1996 | Hultermans | 385/60 |
| 5,708,742 A * | 1/1998 | Beun et al. | 385/53 |
| 5,734,770 A | 3/1998 | Carpenter et al. | 385/72 |
| 5,734,778 A | 3/1998 | Loughlin et al. | 385/140 |
| 5,748,819 A | 5/1998 | Szentesi et al. | 385/60 |
| 5,810,614 A | 9/1998 | Ruch | 439/557 |
| 5,876,246 A | 3/1999 | Martin | 439/557 |

(Continued)

*Primary Examiner*—Hae Moon Hyeon
(74) *Attorney, Agent, or Firm*—Fitzpatrick, Cella, Harper & Scinto

(57) ABSTRACT

A bezel for facilitating the connection between an external device positioned on one side of a communication panel and a module located on the other side of the panel where the panel has an opening for receiving the bezel. The bezel includes a housing defining an interior portion of the bezel, a first open end for insertion into the opening of the panel and the module, where the first open end receives a first communication connection from the module for connection with the external device, and a second open end having a removable cover. The second open end receives a second communication connection from the external device for connection with the first communication connection.

20 Claims, 2 Drawing Sheets

U.S. PATENT DOCUMENTS

| | | | |
|---|---|---|---|
| 5,887,100 A | 3/1999 | Robertson | 385/76 |
| 5,896,477 A | 4/1999 | Stephenson et al. | 385/53 |
| 5,930,426 A | 7/1999 | Harting et al. | 385/56 |
| 5,956,444 A | 9/1999 | Duda et al. | 385/53 |
| 5,999,411 A * | 12/1999 | Patel | 361/759 |
| 6,081,647 A | 6/2000 | Roth et al. | 385/139 |
| 6,149,315 A | 11/2000 | Stephenson | 385/60 |
| 6,186,670 B1 | 2/2001 | Austin et al. | 385/55 |
| 6,188,827 B1 | 2/2001 | Stephenson | 385/140 |
| 6,302,592 B1 | 10/2001 | Zullig | 385/60 |
| 6,354,746 B1 | 3/2002 | Lee | 385/77 |
| 6,447,172 B1 | 9/2002 | Stephenson et al. | 385/70 |
| 6,508,593 B1 | 1/2003 | Farnsworth et al. | 385/55 |
| 6,695,485 B1 * | 2/2004 | Estrella et al. | 385/53 |
| 7,029,182 B2 | 4/2006 | Ngo | 385/53 |
| 2004/0240826 A1 | 12/2004 | Daoud et al. | 385/135 |

* cited by examiner

BEZEL FOR FIBER OPTIC COMPONENTS

This application is a continuation of application Ser. No. 11/584,661, filed Oct. 23, 2006, which is a continuation of application Ser. No. 11/378,348, filed Mar. 20, 2006, now U.S. Pat. No. 7,153,032, issued Dec. 26, 2006, which is a continuation of application Ser. No. 10/775,682, filed Feb. 10, 2004, now U.S. Pat. No. 7,036,994, issued May 2, 2006, which is a continuation of application Ser. No. 09/628,348, filed Jul. 28, 2000, now U.S. Pat. No. 6,695,485, issued Feb. 24, 2004. Those applications are incorporated by reference herein in their entireties.

FIELD OF THE INVENTION

The present invention relates to a bezel for connection of optical components to an optical coupler. More particularly, the present invention relates to a bezel for connecting an optical attenuator to an optical coupler.

BACKGROUND OF THE INVENTION

Connectors for optical fiber transmission systems are known in the art. Often times it becomes necessary to arrange a plurality of optical fiber connectors in a panel to facilitate multifiber connections. Desirably, devices for holding connectors are mounted in the panel but the connectors themselves are not connected to incoming or outgoing fiber paths until needed to provide service. Commonly used devices which are used to accommodate interconnections are referred to as couplings.

A very much used connector for terminating and connecting two optical fibers is one which is referred to as an SC connector. An SC connector is connected to another SC connector from a module through an SC coupling by linear motion only.

Many optical fiber communication systems require a method of decreasing optical power at a reducing station to avoid the saturation of receivers. Such a reduction in power may be accomplished by introducing into the system a device known as an attenuator which is designed to dissipate or to attenuate a controlled fraction of the input power while allowing the balance to continue through the system. Such an attenuator is disclosed in U.S. Pat. No. 5,082,345 in the names of R. R. Cammons, A. W. Carlisle and N. R. Lampert.

Typically, an attenuator is attached to an SC optical coupler which is attached to a communication module within a control panel; attenuators are very often not included on an optical communication module until a connection is required. This is because depending upon the connection, a different strength optical signal may be required. At the time a connection is required, the panel is opened, and the module containing the SC optical coupler is removed so that an appropriate attenuator may be connected.

This method of installing an attenuator is very laborious and requires that the communication module from which the SC optical coupler is connected to be placed temporarily out of service.

Thus, there exists the need to be able to attach an attenuation device to the module without having to take the module out of service.

SUMMARY OF THE INVENTION

The present invention addresses the above concern and presents a new and novel device for facilitating the connection of an external optical component to a panel. Moreover, the present invention lends itself to connection of an attenuation device to an optical coupler without disrupting an optical module.

In one aspect of the present invention, a bezel for facilitating the connection of an optical connector between an optical couple positioned on a module within a panel.

The bezel includes a housing, a first end for insertion into the panel, an interior portion positioned within the housing for positioning of an optical coupler and a second end having a removable cover concealing an opening. The opening exposes an end of the optical coupler positioned within the interior of the bezel for connection to the external device.

In another aspect of the present invention, the above described bezel may be used in conjunction with a fiber optical connection panel which includes a communication module including a fiber optical connector for making a connection with an external optical device, and connection surface adjacent the module having an opening corresponding to the connector. The bezel according to the present invention is positioned within the opening and facilitates the optical connection between the connector and the external device.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
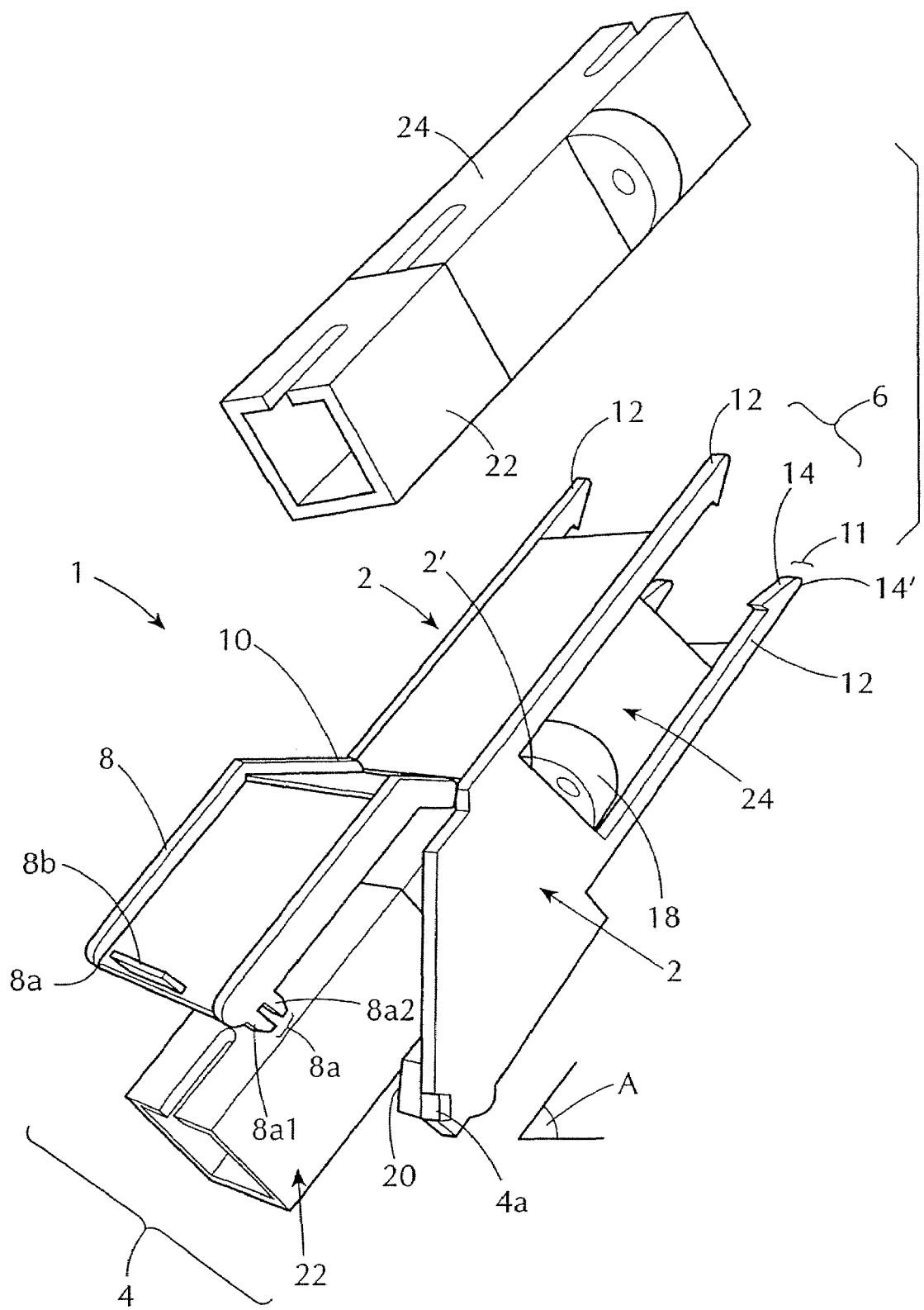
FIG. 1 is a perspective view of a bezel for connection of optical components according to the present invention.

Referring now to FIG. 1, a bezel 1 for facilitating connection of an attenuator 22 to an optical coupler 24 includes a housing 2, an end 6 for being received in a corresponding receiving area in an optical communication module within an opening in a panel housing optical fiber connections and the like. The housing 2 is a body that has a first peripheral end, at least one edge 2' of which engages with the optical coupler 24 at a corresponding edge or retaining tab 18 of the optical coupler 24 extending from a body portion of the optical coupler 24 (for convenience, only one edge 2' and one tab 18 are shown in the drawings).

The bezel may be manufactured from a variety of materials including metal and plastic, but is preferably made from plastic, and is preferably manufactured by injection molding.

The bezel 1 also includes an end 4 having a hinged cover 8, which conceals an opening exposing an end of an optical coupler 24 positioned in an interior portion within the bezel housing. The cover 8 abuts edges of the housing 2 forming a second peripheral end of the body of housing 2, when the cover 8 is in a closed position, and the housing 2 has at least one guiding member (structural abutment) 20 disposed along an interior wall of the housing 2, for guiding an external device, such as the attenuator 22, within the interior of the housing 2. For convenience, only a single guiding member 20 is shown in the drawings, although there may be a guiding member 20 disposed along both opposing interior walls of the housing 2.

The hinged portion 10 of the cover may be integral with the housing 2, or it may include an actual hinge, a half of which is included on the cover and the remaining half being positioned on an upper portion of the end 4 of the bezel.

The cover may also include locking tabs 8a. The tabs 8a include two halves 8a1 and 8a2 with ends having inclined surfaces that enable easy insertion into a corresponding opening 4a positioned adjacent end 4 of the bezel housing 2. When the cover is placed in a closed position to conceal the interior portion within the end 4, the two halves of the tabs 8a compress together. A force generated by the compression of the halves is placed on the sides of the openings 4a, allowing the cover to remain in a closed position.

The cover is easily opened by applying an outward force on lifting tab 8b. The outward force overcomes a frictional force created between each half of the locking tabs and the respective wall of the opening 4a, thereby allowing the cover to open and expose the interior of the bezel housing.

Adjacent end 6 of the bezel are several locking cams 11 positioned on the end of corresponding finger projections (projecting members) 12. Each projection 12 includes an end having an inclined portion 14 ending in a shoulder portion 14', wherein the inclined portion 14 and shoulder portion 14' of each projection 12 form a respective cam surface of the corresponding cam 11. The cams 11 are received in corresponding slots on a module within the panel, and lock thereto. The slots in the module surround an optical connector for connection to the optical coupler of the bezel. The cams 11 restrain the optical coupler in the bezel from linear movement away from optical connector of the optical module and also prevent the bezel from being pulled away from the panel, or dislodged in any way.

Figure 2:
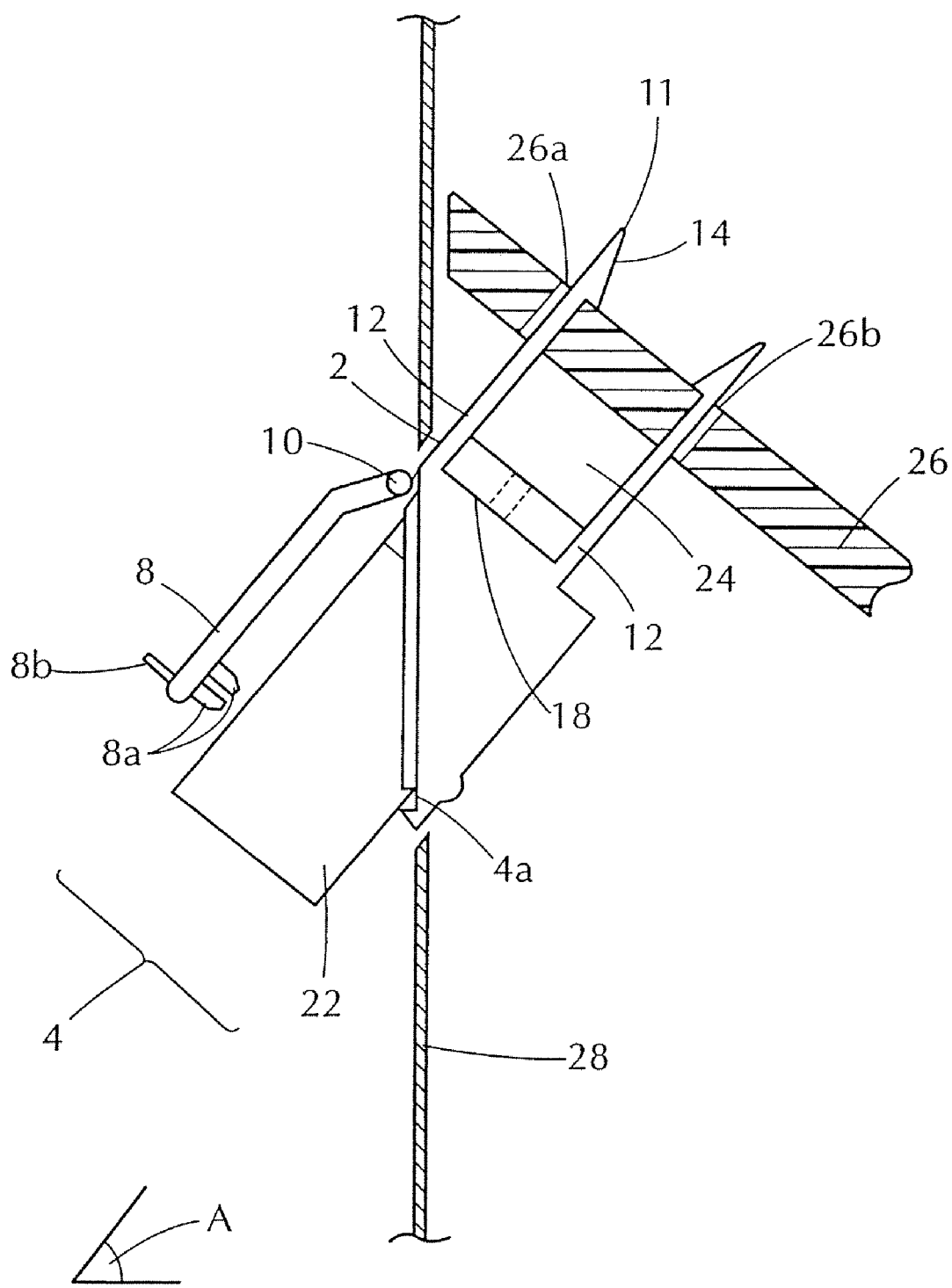
FIG. 2 is a side sectional view of the bezel according to the present invention.

As can be appreciated in view of FIGS. 1 and 2, the body of the housing 2 and the projections 12 define, in combination, a volume extending from the second peripheral end of the body of the housing 2, through an interior of the body, to distal ends of the projections 12. The volume can receive at least a portion of each of the optical coupler 24 and attenuator 22 therein.

It will be appreciated by one of skill in the art, that the bezel cover in the cover in the closed position is preferably flush with a vertical access panel surface of an optical connection box. Thus, the housing of the bezel is connected with the optical module at a downward angle, shown as angle A with a horizontal reference in FIG. 2. Positioning the bezel at a downward angle relative to a vertical access panel helps to avoid any potential eye injury to a technician working with the coupler within the bezel. Accordingly, if the bezel housing was instead mounted substantially perpendicular to the access panel, a technician might accidentally look directly into the optical coupler, and thus the light path, within the bezel housing potentially damaging his vision. By mounting the bezel housing at a downward angle, the direction of light emanating from the optical coupler within the bezel housing is downward away from the eye level of a technician and toward the ground.

FIG. 2 illustrates the bezel according to the present invention as assembled with an optical module 26 inside a panel 28. The locking cams 11 are received by corresponding slots 26a and 26b which allow the locking cams 11 to pass through and lock on the other side. The slots are positioned away from one another in the vertical direction as seen in FIG. 2 so that the distance between the inside walls of a pair of adjacent slots, 26a and 26b, is equal to the distance between the two corresponding projecting fingers 12 of the bezel. The slots are also formed so that the respective cam can easily fit through and lock on the other side.

As soon as the cams pass through the module wall, they lock into place, yielding an audible "snap" sound indicating that the bezel is locked into place. Thus, the bezel cannot be removed from outside the panel or the module.

Depending upon the bezel design, the front 4 of the bezel may snap into a cutout in the front panel of the optical connection box. When access to a particular optical module is required, the cover 8 is opened by pulling back on tab 8b, exposing the optical coupler. The external optical component may then be connected to the exposed end of the optical coupler to complete the communication connection.

This system is especially advantageous in connecting an attenuator to the optical module. Once an appropriate attenuator is selected for a particular application, one end of the attenuator is plugged onto an external optical connector, the bezel cover is lifted, and then the other end of the attenuator is plugged into the optical coupler positioned within the bezel housing.

It is to be understood that the above-described arrangements are simply illustrative of the invention. Other arrangements may be devised by those skilled in the art which will embody the principles of the invention and fall within the spirit and scope thereof.

What is claimed is:

1. An apparatus, comprising:
   a housing body defining an interior chamber and having a first end configured to fit into a module of a communication panel, the housing body also having a second end, opposite to the first end, the second end configured to receive a communication connection from an external device; and
   a positionable cover mechanically coupled to the second end, the cover being positionable in a closed position in which the cover conceals the interior chamber, and in an open position in which the cover does not conceal the interior chamber, thus facilitating reception of the communication connection through the second end of the housing body.

2. The apparatus according to claim 1, wherein at least one of the first and second ends has an opening therein, and the interior chamber is configured to receive an optical coupler through the opening in one of the first and second ends.

3. The apparatus according to claim 2, wherein the optical coupler is an SC coupler.

4. The apparatus according to claim 1, wherein the external device is an optical attenuator.

5. The apparatus according to claim 1, wherein the cover is mechanically coupled to the housing body by way of at least one hinge.

6. The apparatus according to claim 1, wherein the first end is formed by a plurality of projecting members, each projecting member including an end having an inclined portion ending in a shoulder portion, the inclined portion and the shoulder portion forming at least a portion of a cam surface.

7. The apparatus according to claim 6, wherein at least part of the cam surface is configured to lock to the module.

8. The apparatus according to claim 1, wherein the housing body also includes a guiding member formed along the interior chamber to guide least part of the external device within the interior chamber.

9. The apparatus according to claim 1, wherein the second end is configured to be substantially flush with the communication panel when the cover is in the closed position.

10. The apparatus according to claim 1, wherein the housing body extends along a plane that forms an angle relative to the communication panel.

11. The apparatus according to claim 1, wherein the external device is optically coupled to an optical component.

12. The apparatus according to claim 11, wherein at least one of the first and second ends has an opening therein, and the interior chamber of the housing body is configured to receive at least part of the optical component through the opening in one of the first and second ends.

13. The apparatus according to claim 11, wherein the external device is configured to be optically coupled to the optical component without substantially disrupting operation of the module.

14. The apparatus according to claim 1, wherein the housing body has at least first and second opposing side surfaces disposed on opposite sides of the interior chamber, and the cover is mechanically coupled to the housing body between the first and second side surfaces.

15. The apparatus according to claim 14, wherein edges of the first and second opposing side surfaces are coextensive.

16. The apparatus according to claim 14, wherein the cover is substantially flush with the edges of the first and second opposing side surfaces when the cover is in the closed position.

17. An apparatus, comprising:
a housing body forming an interior chamber extending between opposing ends of the apparatus, at least one of the ends being configured to receive at least part of an external device;
a plurality of connecting members extending from a further one of the ends, the connecting members configured to fit into a module of a communication panel; and
a cover mechanically coupled to the housing body adjacent at least one of the ends, the cover being positionable in a closed position in which the cover covers that at least one end, concealing the interior chamber, and in an open position in which the cover does not cover that at least one end to facilitate reception of the part of the external device.

18. The apparatus according to claim 17, wherein the plurality of connecting members each include an end having an inclined portion ending in a shoulder portion, the inclined portion and the shoulder portion forming at least a portion of a cam surface.

19. The apparatus according to claim 18, wherein at least part of the cam surface is configured to lock to the module.

20. The apparatus according to claim 17, wherein the external device is an optical attenuator.

* * * * *